Dec. 25, 1956  W. H. BONELL ET AL  2,775,116
METHOD OF TESTING PRESSURE VESSELS
Filed July 17, 1953  2 Sheets-Sheet 1
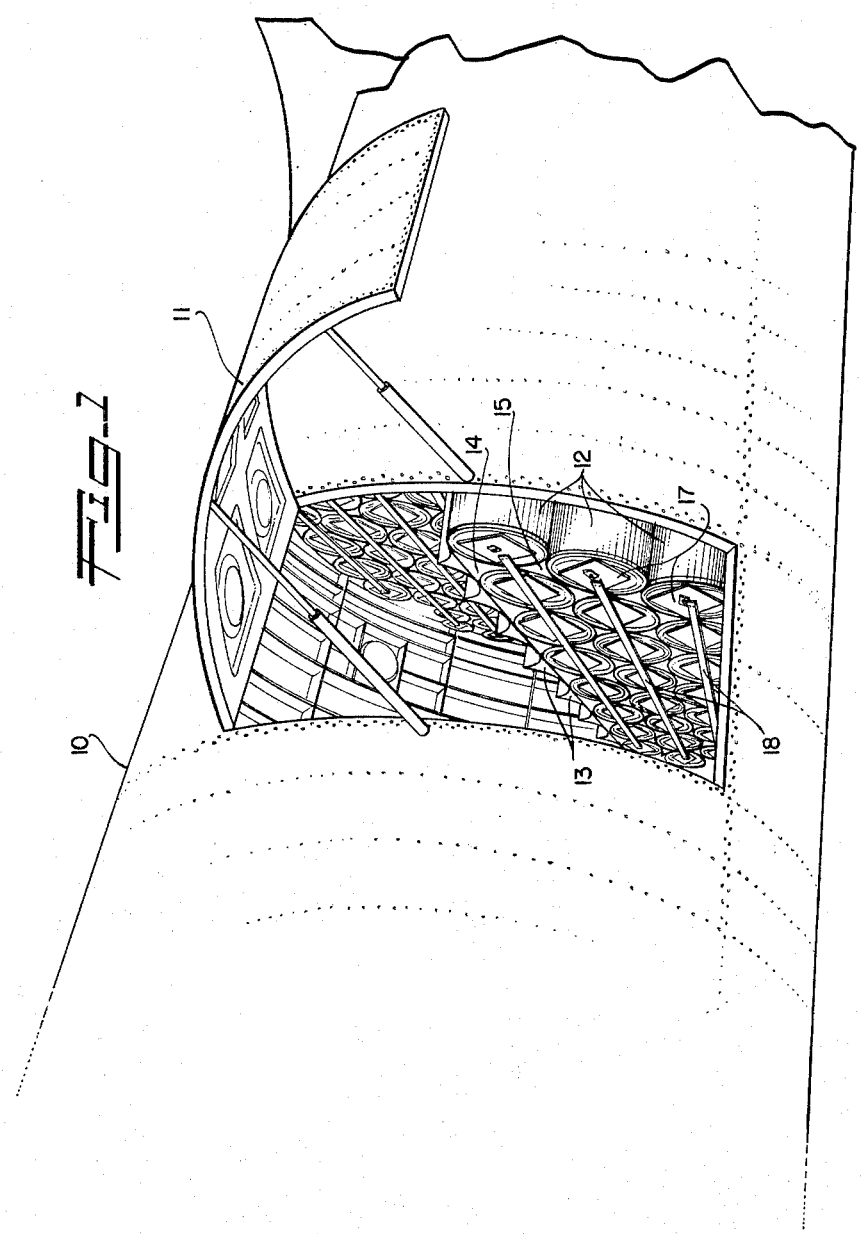
INVENTORS
WILLIAM H. BONELL
BOYD E. LUDWIG
By
Agent

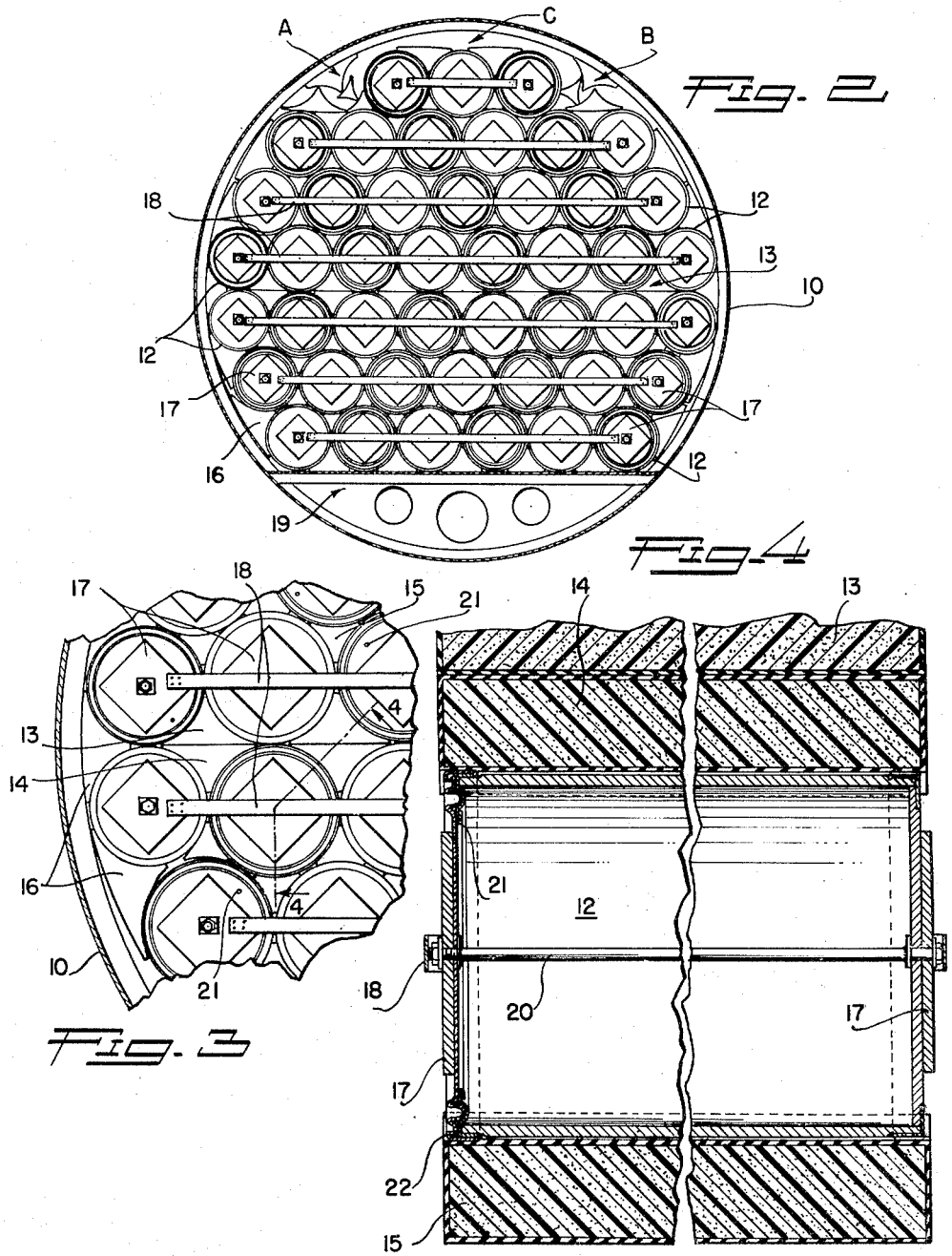

United States Patent Office 2,775,116
Patented Dec. 25, 1956

2,775,116

METHOD OF TESTING PRESSURE VESSELS

William H. Bonell, Pasadena, and Boyd E. Ludwig, Encino, Calif., assignors to Lockheed Aircraft Corporation, Burbank, Calif.

Application July 17, 1953, Serial No. 368,612

6 Claims. (Cl. 73—37)

This invention relates to a method of air testing pressure vessels of large cubic content using in conjunction therewith suitable space filler materials.

In testing containers, tanks, aircraft fuselage sections or other similar and like space enclosing forms or shapes, which have among their other design functions the requirement of carrying internal air pressure, we are faced with a hazardous situation or condition in the event the subject of the test fails. In the event of failure of the space enclosing form or shape under air pressure test, injuries to personnel and damage to equipment and structures is a very great possibility. A method of minimizing the effects of said failure or failures is most desirable and of primary importance from a safety and destruction standpoint.

It is an important object of this invention to minimize the hazardous conditions that are present in air pressure testing of vessels of large cubic content.

Another object of this invention is the development of a suitable material or materials light in weight to be used as a space filler in air pressure testing of vessels of large cubic content.

Another object of this invention is the method of using suitable space filler material or materials light in weight in air pressure testing of vessels of large cubic content.

Other objectives and advantages will become apparent from the following detailed description of a typical utilization of the invention, in which reference is made to the accompanying drawings wherein:

Figure 1 is a more or less diagrammatic fragmentary perspective view of a fuselage section of an airplane embodying the method of the present invention;

Figure 2 is a front elevation of the method of the present invention;

Figure 3 is an enlarged section of a portion of the front elevation showing in more detail certain features of the present invention; and Figure 4 is a cross section view taken from Figure 3 at points 4—4 in order to present in greater detail certain features of the present invention.

The features of the invention are capable of embodiment in applications varying considerably in size, design and applictaion. We will herein describe the form of the invention illustrated in the accompanying drawings, it being understood that the invention is not to be considered as limited to the details of this particular disclosure.

As disclosed in Figure 1, space filler material is installed in place in the aft fuselage section 10 of an airplane as would appear as seen through a port cargo or access door 11 which is shown extended in its full open position. The filler material consists of substantially cylindrical drums or tubes 12 and plastic filler blocks 13. In this view, a number of drums or tubes are omitted in order to more clearly show the internal arrangement and stacking order of drums or tubes 12 and the plastic filler blocks 13. In Figure 3, plastic filler blocks 13, 14, 15 and 16 are more clearly defined. Blocks 13 and 14 are of similar geometric form and are installed in this application with their bases on straight sides back to back or flush. The plastic filler blocks 13 and 14 are of a modified triangular cross section of which one side is straight, the two remaining sides are concave, such concavity being of a degree that will place their concave surfaces concentric to and flush with the cylindrical external surfaces of the tubes or drums. These plastic filler blocks 13 and 14 are used in the spaces adjacent to and in the area between the arrangement of any four drums or tubes as shown in Figure 2 and Figure 3. Also shown in Figure 3 are the plastic filler blocks 15 which are used in the space adjacent to and in the area between the arrangement of any three drums or tubes. The plastic filler blocks 15 are of modified triangular cross section whose faces are concave, such concavity being of a degree that will place their concave surfaces concentric to and flush with the cylindrical extermnal surfaces of the tubes or drums. Also shown in Figure 3 are the plastic filler blocks 16 which are used in the space adjacent to and in the area between the arrangement of any two drums or tubes and the internal curved surface of the fuselage. The plastic filler blocks 16 are of a modified triangular cross section, two faces being concave such concavity being of a degree that will place their concave surfaces concentric to and flush with the cylindrical external surfaces of the tubes or drums, the remaining surfaces being convex. Such convexity is of a degree that will place the convex surface concentric to and flush with the internal curved surface of the fuselags.

In Figure 2 we see the arrangement of the space filling drums or tubes 12 and the plastic filler blocks 13, 14, 15 and 16. There is also shown in Figure 2 plywood and reinforcing plates 17 for the drums 12 and bands or straps 18 used to hold the drums or tubes 12 and the plastic filler blocks 13, 14 and 15 together. Such mechanical linkage transmits the dead weight load to the floor 19 and not to the sides of the adjacent fuselage 10, said bands or strap 18 being attached only to those plywood end reinforcing plates 17 which are used on the drums or tubes 12 that are positioned at the extremities of each horizontal row of said drums or tubes. Figure 4 shows a cross section view of a typical tube or drum, said view being taken at points 4—4 from Figure 3. This view, Figure 4, shows the method of reinforcing a tube or drum 12 by means of a rod 20 joining two plywood end reinforcing plates 17 which are positioned at each end of the tubes or drums 12, said plywood reinforcing end plates 17 being mechanically joined by means of rod 20 and necessary attaching or fastening devices. Figure 4 also show a hole 21 drilled in the top of each drum or tube to vent and meter the air on decompression in the event of fuselage failure. The vent 21 saves the containers 12 from collapsing during pressurization and slowly relieves the pressure in the containers when decompression of the surrounding space occurs. Figure 2 also shows the stacking arrangement of the tubes or drums in that the detachable top of one tube or drum and the fixed bottom of an adjacent tube or drum are in approximately the same geometric plane. This arrangement is desirable as there is a flange 22 on the top portion of each tube or drum that would bring about an unevenness in the stacking of said tubes or drums if such alternate arrangement of the tops and bottoms were not considered. Further, referring to Figure 2, we see at the upper portion A and B numbers of the prior described plastic filler blocks in order to further occupy some of the remaining free air space. It can be readily seen that geometric forms of the plastic filler blocks could be designed to occupy these spaces A and B and likewise the space shown at point C, the said plastic filler blocks being in all instances dip coated with a tough plastic in order to reduce handling damage, said plastic filler blocks being formed by casting in paper or corrugated cardboard forms.

It has been determined that the air displacement in a cavity should be reduced materially in order to minimize danger to personnel and possible structural damage in case of failure of said cavity under air pressure test. In this invention the tubes or drums occupy 60 to 70% of the fuselage cavity and the plastic filler blocks which occupy the spaces between the drums or tubes, and the spaces between the drums or tubes and the fuselage occupy 20 to 25% of the fuselage cavity. Thus it can be seen that the area occupied by the cavity filler material is partially inactive as far as explosive decompression is concerned. We have reduced the explosive decompression cubic area and as a result have developed and invented a test procedure for large volumes that reduces the hazard incident thereto. The area to be tested, in this application a portion of an aircraft fuselage, is prepared in the manner described and shown by the various figures of the drawings. The test area is then sealed off by moving to the closed position all openings adjacent to the area under test. Air is introduced to the area by external means until the amount of pressure desired is obtained. In this manner we are able to determine whether the pressure vessel has built into it such air tight and pressure resistant features that may be desired.

Having described only a typical embodiment of the invention we do not wish to be limited to the specific details set forth but reserve to ourselves any features that may fall within the scope of the following claims.

We claim:

1. A method of pressure testing large vessels comprising stacking hollow vented drums within the vessel to be tested, inserting space filling forms in the voids between the hollow drums, closing all external openings in the vessel necessary to render the same substantially fluidtight, and thereafter pressurizing the vessel.

2. A method of pressure testing large vessels comprising stacking hollow drums within the vessel to be tested, providing said drums with small vent openings to allow the flow of fluid therethrough at a controlled rate, inserting space filling forms in the voids between the hollow drums to reduce the total internal vessel volume, closing all external opening in the vessel necessary to render the same substantially fluidtight, and then filling the pressure vessel including the vented drums with fluid to produce the testing pressure.

3. A method of pressure testing large vessels comprising stacking hollow vented containers inside the vessel to be tested, mechanically joining said containers together prior to the test to localize the dead weight load thereof, closing all external openings in the vessel necessary to render the same substantially fluidtight, and thereafter filling the pressure vessel including the vented containers with fluid to produce the testing pressure.

4. A method of pressure testing large vessels comprising stacking a plurality of hollow, vented drums inside the vessel to be tested, inserting space filling forms in the voids between the drums to reduce the total internal vessel volume, mechanically joining said drums together to localize the dead weight load thereof and to hold said space filling forms in position, closing all external openings in the vessel necessary to render the same substantially fluidtight and thereafter filling the pressure vessel including the vented drums with fluid to produce the testing pressure.

5. A method of pressure testing large vessels comprising substantially filling the vessel to be tested with a plurality of hollow, vented containers, closing all external openings in the vessel necessary to render the same substantially fluidtight and thereafter filling the pressure vessel including the vented containers with fluid to produce the testing pressure.

6. A method of pressure testing large vessels comprising first filling a vessel to be tested with vented drums, second filling the voids between said drums with pre-cast plastic forms, then closing all external openings in the vessel necessary to render the same substantially fluidtight, and finally pressurizing the vessel to the testing pressure.

References Cited in the file of this patent

UNITED STATES PATENTS

| | | |
|---|---|---|
| 1,704,612 | Johnson | Mar. 5, 1929 |
| 1,734,805 | Hawthorne | Nov. 5, 1929 |
| 2,323,063 | Long | June 29, 1943 |
| 2,396,380 | Longley | Mar. 12, 1946 |